US009573310B1

(12) United States Patent
Archuletta

(10) Patent No.: US 9,573,310 B1
(45) Date of Patent: Feb. 21, 2017

(54) METHOD FOR MAKING A DURABLE WOOD-PLASTIC COMPOSITE PANEL UPON WHICH PLASTIC FILMS MAY BE READILY AND SECURELY ADHERED

(71) Applicant: Phil T. Archuletta, Mountainair, NM (US)

(72) Inventor: Phil T. Archuletta, Mountainair, NM (US)

( * ) Notice: Subject to any disclaimer, the term of this patent is extended or adjusted under 35 U.S.C. 154(b) by 363 days.

(21) Appl. No.: 14/338,956

(22) Filed: Jul. 23, 2014

Related U.S. Application Data

(60) Provisional application No. 61/857,921, filed on Jul. 24, 2013.

(51) Int. Cl.
| | | |
|---|---|---|
| *B29C 43/44* | (2006.01) | |
| *B29C 43/52* | (2006.01) | |
| *B29C 47/00* | (2006.01) | |
| *B29D 99/00* | (2010.01) | |
| *B32B 7/12* | (2006.01) | |
| *B32B 15/02* | (2006.01) | |
| *B32B 21/02* | (2006.01) | |
| *B29L 7/00* | (2006.01) | |
| *B29L 9/00* | (2006.01) | |
| *B29K 101/12* | (2006.01) | |
| *B29K 105/16* | (2006.01) | |

(52) U.S. Cl.
CPC ......... *B29C 47/0064* (2013.01); *B29D 99/001* (2013.01); *B32B 7/12* (2013.01); *B32B 15/02* (2013.01); *B32B 21/02* (2013.01); *B29K 2101/12* (2013.01); *B29K 2105/16* (2013.01); *B29L 2007/002* (2013.01); *B29L 2009/00* (2013.01); *B32B 2250/04* (2013.01); *B32B 2260/021* (2013.01); *B32B 2260/026* (2013.01); *B32B 2260/046* (2013.01); *B32B 2307/416* (2013.01)

(58) Field of Classification Search
CPC ..... B29C 47/0064; B29D 99/001; B32B 7/12; B32B 15/02; B32B 21/02; B32B 2250/04; B32B 2260/021; B32B 2260/026; B32B 2260/046; B32B 2307/416; B29L 2007/002; B29L 2009/00; B29K 2101/12; B29K 2105/16
USPC ...................................... 156/244.11
See application file for complete search history.

(56) References Cited

U.S. PATENT DOCUMENTS

| | | | | |
|---|---|---|---|---|
| 4,788,088 | A * | 11/1988 | Kohl ................... | B29C 47/0038 174/36 |
| 6,586,504 | B1 * | 7/2003 | Archuletta .............. | C08L 97/02 524/13 |
| 7,914,275 | B1 * | 3/2011 | Archuletta .......... | B29C 47/0038 425/335 |

* cited by examiner

*Primary Examiner* — Philip Tucker
*Assistant Examiner* — Vicki Wu
(74) *Attorney, Agent, or Firm* — Rod D. Baker

(57) ABSTRACT

An apparatus and method for fabricating a panel from a molten composite material, and a panel product fabricated accordingly. Two platens in spaced relation define a gap which decreases uniformly from first ends of the platens toward second ends of the platens. Molten composite material is moved through the decreasing gap to compress the material between the platens. Cooling drums cool the composite panel shortly after extrusion. A mesh is rolled into a surface of the extruded panel; the screen remains partially exposed on the panel surface to provide a panel surface amenable to the application of adhesives.

11 Claims, 8 Drawing Sheets

METHOD FOR MAKING A DURABLE WOOD-PLASTIC COMPOSITE PANEL UPON WHICH PLASTIC FILMS MAY BE READILY AND SECURELY ADHERED

CROSS-REFERENCE TO RELATED APPLICATIONS

This application claims the benefit of the filing of U.S. Provisional Patent App. Ser. No. 61/857,921 entitled "Method for Making a Durable Wood-Plastic Composite Panel Upon Which Plastic films May Be Readily and Securely Adhered," filed on 24 Jul. 2013, and the specification thereof is incorporated herein by reference.

BACKGROUND OF THE INVENTION

Field of the Invention (Technical Field)

The present invention relates to apparatus for manufacturing composite materials of wood and plastic, particularly sheets of relatively high density wood-plastic composition, and especially to a manufacturing method for composite sheets upon which selected films can readily be adhered, and to composite sheets so manufactured.

Background Art

It is known to manufacture composite materials from mixtures of ground or milled wood and finely ground plastics. A method and apparatus for manufacturing such a composition is disclosed in U.S. Pat. No. 7,914,275 entitled "Apparatus for Making High Density Wood and Plastic Composites," the entire disclosure of which is incorporated herein by reference. It is generally desirable to manufacture composite material in sheets or panels suitable for use in the construction of buildings, signs, and the like. Other wood particle and thermoplastic particle compositions and panels manufactured there-from, and modes of fabrication therefore, also are taught in my U.S. Pat. Nos. 6,632,387 and 6,586,504, whose complete contents also are incorporated herein by this reference.

Current manufacturing techniques for thermoplastic-fiber composite materials focus on the extrusion process, whereby a molten cellulose/thermoplastic mix is forced under high pressure through a forming die. The product is shaped and formed corresponding to the die, and then allowed to cool. In some instances, the cooling of the extruded product is accomplished by wrapping the extruded product around one or more large, chilled, cylindrical mandrels. Such a cooling technique, however, flexes the product resulting in unacceptable fracturing of sheet or panel product having a thickness of more than about 0.5 inches. Alternatively or additionally, known fabrication processes require post-extrusion cooling mechanisms that are dozens of feet long, demanding large manufacturing facilities. Known extrusion-type production devices generally also are limited as to both the width and thickness of panels or sheets than can effectively be produced.

A further shortcoming of known systems and methods for manufacturing cellulose/plastic composites is the difficulty in fabricating a composite panel to which a polymeric film may be easily and securely attached with an ordinary know, and perhaps yet-to-be-developed, adhesive. Known extrusion processes for wood-plastic composite panel fabrication result in a cooled panel with a very smooth surface having thereon a thin layer of melted polymers. This layer or coating is an unavoidable consequence of the heated extrusion process for extruding a wood-plastic composite. The thin layer manifests a slick, "oily," character that resists adhesion thereto of most commonly used adhesives, especially adhesives by which, for example, a thin plastic layer or film (e.g., 3M® Type IV Prismatic Reflective Sheeting, or 3M® Diamond Grade™ Types IX and XI Reflective Sheeting) be attached to the panel surface. It is desirable to secure to a composite panel surface another layer, such as a thin plastic film, when for example it is desired to apply a visual sign or other layer to the cooled panel surface. Extruded wood-plastic composites exhibit excellent durability, strength, and weathering characteristics for use as the foundation for road signs, but many preferred types of film appliqués for use as signs are difficult to apply to such composites.

In summary, therefore, there is an unmet need for a method of manufacturing a wood-plastic composite material in sheets that can readily be cut into construction panels of conventional size (e.g. four feet by eight feet), which material is of adequate density and durability for use as a construction material, but which such fabrication method results in a panel with a working surface to which conventional adhesives readily adhere. It is especially desirable that the working surface need no pre-treatment prior to the application of an adhered film or layer, such as a surface coating or sign. Against this background, the present system and process was developed.

SUMMARY OF THE INVENTION

There is disclosed herein a pressing apparatus for fabricating a dense, rigid, durable panel from a molten composite material. Succinctly described, the apparatus features a first platen in spaced and angled relation to a second platen to define between said platens a gap. The gap decreases uniformly from first ends of the platens toward second ends of the platens, and conveyer belts, movably disposed along opposing surfaces of said platens, move molten composite material through the decreasing gap to compress the molten composite material between the platens.

Cooled drums are provided whereby the molten composite is cooled shortly after extrusion. A fine screen, preferably a metal screen mesh, is rolled into one side (surface) of the extruded panel prior to the panel's completed cooling. The screen is not fully embedded into the extruded panel, rather it remains partially exposed on one side of the panel, and provides that surface with a character amenable to the application of adhesives.

There also is disclosed a method for making a composite wood-plastic composition which incorporates a mesh on a working surface thereof. Secondary films and sheets may be readily and securely adhered to the working surface without the need for flaming or similar pre-treating the working surface to remove anti-adherent polymer residues from prior extrusion. A panel fabricated according to this method is disclosed and enabled.

A primary object of the present invention is to provide a method and apparatus for manufacturing a cellulose/thermoplastic composite panel of substantial thickness, width, density and strength, but to a working surface of which a thin film can later be securely adhered using conventional adhesives, and without the need to pre-treat the working surface.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings, which are not necessarily to scale within a particular figure or between figures, are only for the purpose of illustrating an embodiment of the invention and are not to be construed as limiting the invention. In the drawings.

DESCRIPTION OF THE PREFERRED EMBODIMENTS

Figure 1:
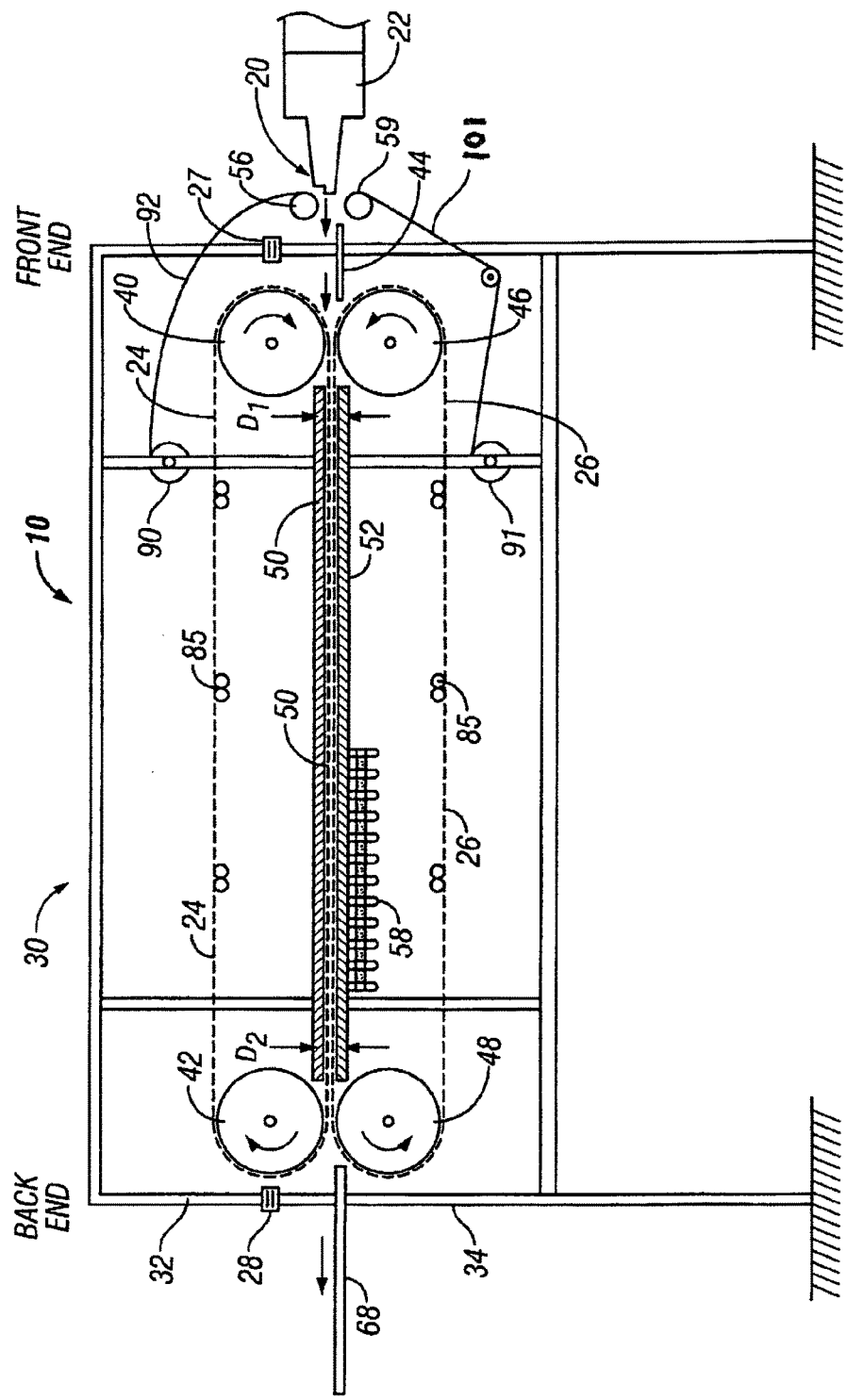
FIG. 1 is a left side elevation diagram, in partial section, of an apparatus according to the present disclosure.

This disclosure has to do with the fabrication of strong, dense, useful panels comprised of a plastic/fibers composition. It is contemplated that the panels are manufactured from an extruded composite material having wood particles and thermoplastic particles as its primary ingredients, but the invention is not so limited. There is provided according to the present disclosure an apparatus and method for manufacturing a wood-plastic component that is more durable, stronger, and denser than similar composites produced with known techniques. The present apparatus and method provide for the controlled compression of the composite while it cools, resulting in enhanced physical characteristics of the end product. The invention also promotes cooling at a suitable rate with a modest water-cooling system much less elaborate than water-cooling systems in devices currently used in the art. By providing a "moving press" apparatus and technique, the molten composite material is expelled from an extrusion die, but then cools under pressure conditions that generate a composite material panel that is dense and strong, and which also permits the fabrication of panels that are wider than are generally obtained with known devices. During the fabrication process, a mesh or screen is disposed on a surface of a produced panel, resulting in the surface being specially adapted to retain and receive an additional applied layer by use of an adhesive.

This invention is not of any particular extrusion apparatus, or of a specific extrusion die or method. Rather, any or several extruders known in the art may be employed herein, and the disclosed apparatus and method relate to the processing of an extruded composite after it has been expelled from an extruder die. Thus, extruders and extrusion dies known, or yet to be known, in the art may be employed in conjunction with this method and apparatus. However, and as noted, an advantage of the present technique is that it can be used with extruder die(s) to permit production of a panel to a side surface of which a conventional adhesive will readily adhere.

Among the advantages of the presently disclosed system and process is that composite material may be formed into sheets of adequate width, thickness, and density so as to be suitable for use in construction, such as, for example, building panels, signs, and the like which are subjected to weathering heat, moisture, and ultraviolet sunshine. By compressing an extruded cellulose-thermoplastic composition while cooling it in a controlled manner, sheets of suitable thickness, width, and density are manufactured.

Described generally, the method of the present disclosure is to compress a molten, malleable, composition between a pair of converging platens. The composition is pushed and pulled between the platens by a pair of endless belts. As the belts move the composition into a decreasing gap between the platens, the composition is simultaneously compressed and cooled. The concurrent compression and cooling promotes the fabrication of a sheet of hardened composite sheet of desirable density and durability.

Attention is invited to the drawing figures, which depict the various aspects of the apparatus 10 and process. As seen in FIG. 1, the apparatus is situated immediately adjacent to the die 20 on an extruder 22. The extruder 22 is of a known powered type, and forces molten composite through its die 20 and toward the apparatus 10 for further processing. The composite is extruded from the die at around 400 degrees F., and upon such expulsion is a viscous, plastic, malleable semi-solid. Initial preparation of the composite material, prior to heating and extrusion, may be according to instructions known in the art such as, by way of example only, those disclosed in U.S. Pat. No. 6,586,504.

Figure 3:
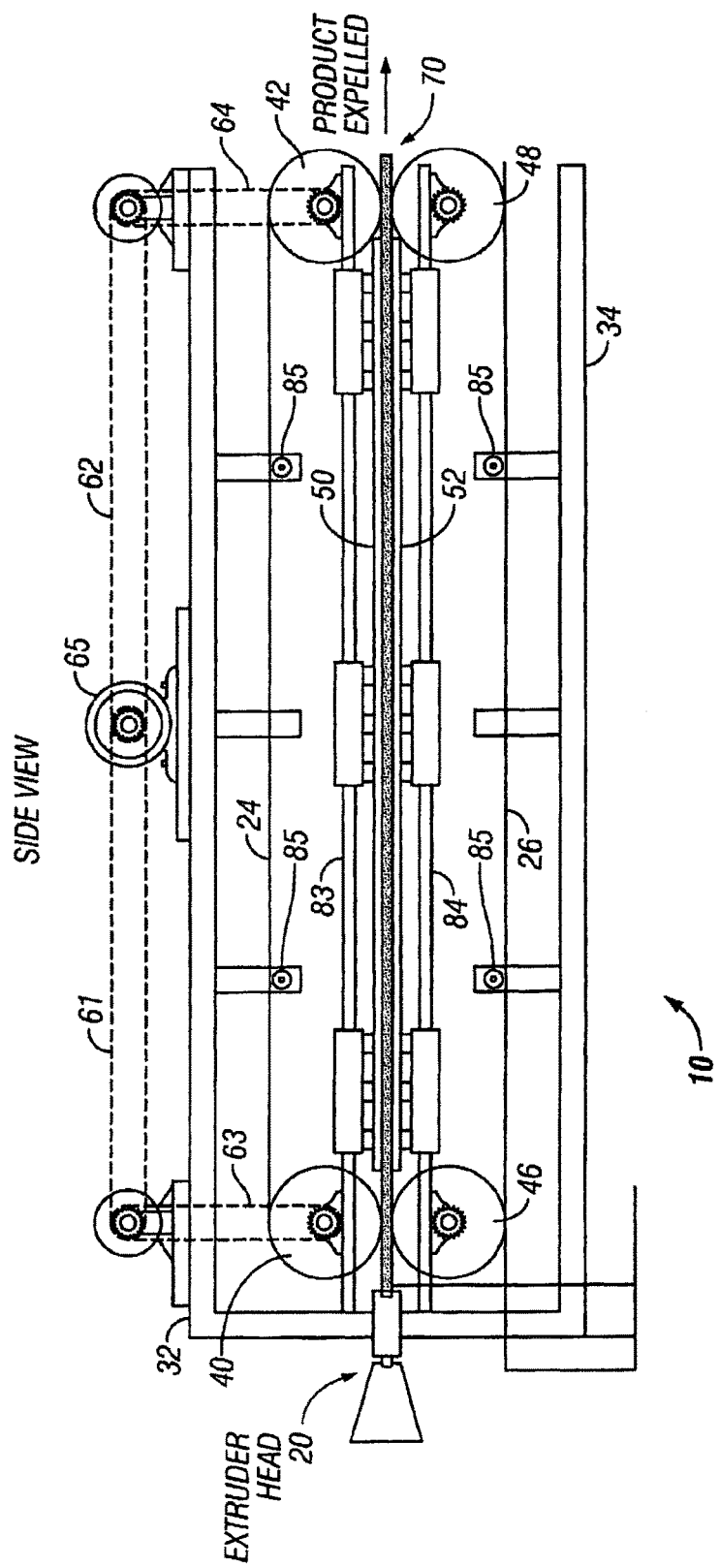
FIG. 3 is a right side elevation diagram of an apparatus according to the present invention.

The extruded material is fed through a moving press system mounted in a frame 30. The support frame 30 is fabricated from, for example, lengths of angle iron, steel tubing, steel rods, brackets, flanges and the like; assembly of the frame 30 is according to ordinary skill as informed by this disclosure. The frame 30 rests upon the floor of a fabrication facility and has an upper frame 32 and lower frame 34. The frame 30 is, by way of example only, about six to fourteen feet long from its front end to its back end, and approximately five feet wide. (The "front" of the apparatus 10 is to the right of the view seen in FIG. 1, while the "back" is to the left side of that figure.) Mounted for powered rotation on the upper frame 32 are a cylindrical upper front roller 40 and a cylindrical upper back roller 42. The upper rollers 40, 42 are journaled in the upper frame 32 for rotation around their preferably parallel, horizontally disposed axes. Similarly mounted for powered rotation on the lower frame 34 are the cylindrical lower front roller 46 and lower back roller 48. As seen in FIGS. 1 and 3, the upper front roller 40 preferably is situated substantially directly above the lower front roller 46, while the lower back roller 48 is substantially directly below the upper back roller 42. The rollers 40, 42, 46, 48 have diameters of, for example six to twenty inches, depending upon the proportional size of the overall apparatus 10.

Preferably, at least one upper roller 40 or 42 is adjustably mounted, so that it can be shifted axially with respect to its own axis (and thus laterally in relation to the frame 30 and extruder 22). At least one of the upper rollers 40, 42 preferably also is adjustable such that it can be shifted in relation to the other upper roller (42 or 40). This adjustability allows the distance between the upper rollers 40, 42 to be varied and temporarily fixed (while preferably keeping parallel the axes of the upper rollers), so that these rollers can be moved closer or farther apart. Preferably, both upper rollers 40, 42 are adjustably mounted, so that either or both can be relocated upon the upper frame 32.

Likewise, at least one (and preferably both) of lower rollers 46 or 48 is adjustably mounted, so that it can be shifted axially with respect to its axis (and thus laterally in relation to the frame 30 and extruder 22). At least one and preferably both of the lower rollers also is adjustable so that it can be shifted in relation to the other lower roller (48 or 46), that is, so that the distance between the lower rollers 46, 48 can be adjusted and temporarily fixed (while maintaining their axes parallel). Adjustability in the lateral (axial) direction also is desirable to assure that the belts 24, 26 (disposed around the rollers as described further herein) remain centered on the rollers during the operation of the apparatus 10.

Figure 2:
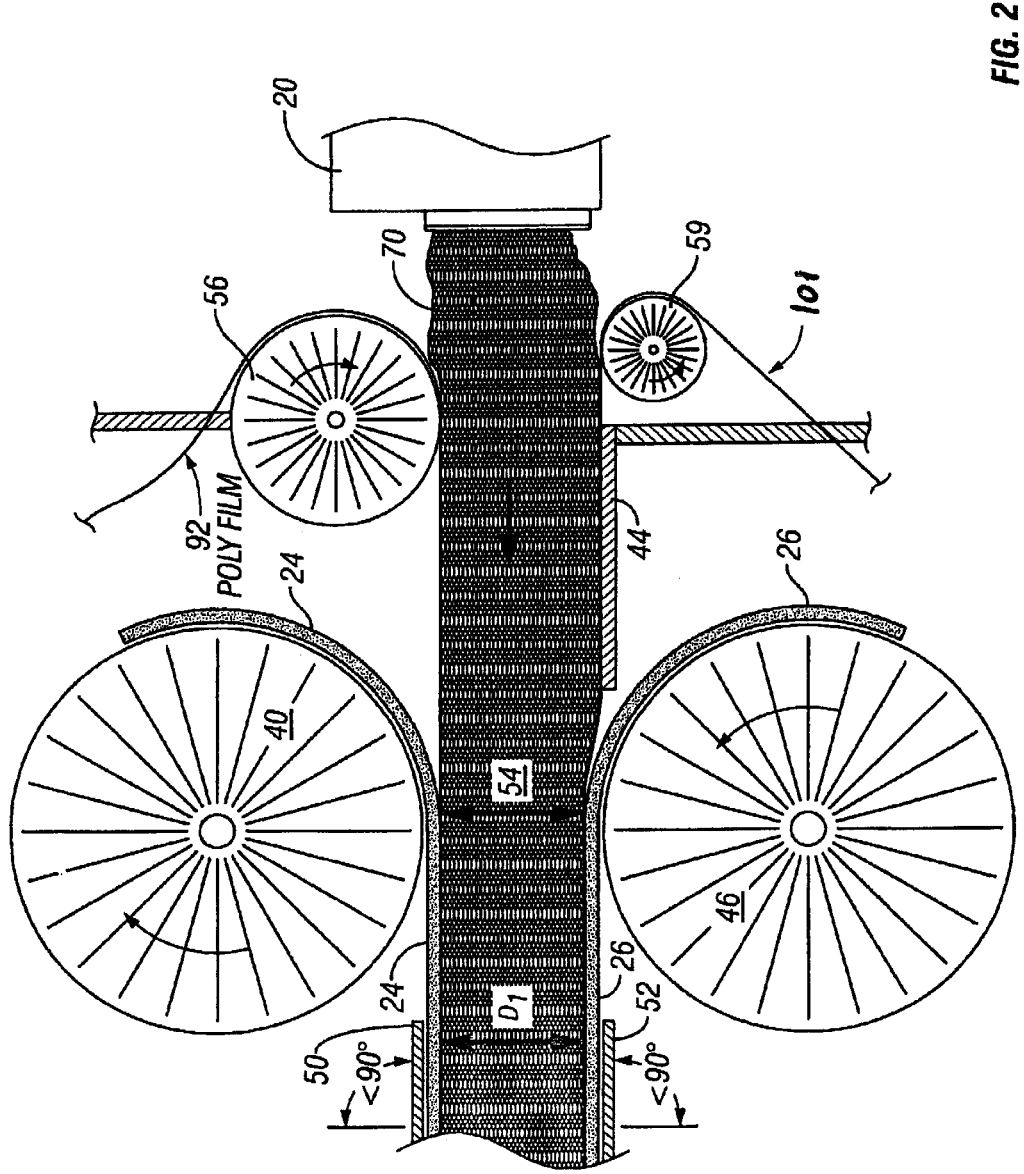
FIG. 2 is an enlarged side view of the left side of a front portion of the apparatus shown in FIG. 1.

Referring to FIGS. 1 and 2, it is seen that the front rollers 40, 46 are disposed in the frame 30 so that there outer surfaces are closely spaced. At their closest mutual approach, the distance separating their parallel (approximately horizontal) tangents is, by way of example in a preferred embodiment, about one inch, plus or minus approximately 0.5 inch. The rear rollers 42, 48 are even more closely spaced, with their closest tangents being about 0.75 inch apart, plus or minus about 0.25 inch. That the front rollers 40, 46 have a separation distance greater than the distance separating the surfaces of the rear rollers 42, 48 is an advantage of the system.

At least one of the upper rollers 40, 42, and at least one of the lower rollers 46, 48, is driven to have powered rotation around its axis. All the rollers may be directly or indirectly connected to a power source. Rotary power may be supplied to any roller (again, at least one upper and at least one lower roller) in any suitable manner, as by having a chain-and-sprocket connection to an electric motor. Practically any means and modes known in the art for powered rotation of cylindrical rollers may be deployed without departing from the scope of the present invention.

The upper frame 32 mounts a flat, rectangular, substantially planar upper platen 50 that is, for example, about five to nine feet long, and between sixteen and forty-eight inches wide. These dimensions are supplied by way of example; all platen dimensions are in proportion to the apparatus 10, whose size is keyed to the size of the composite sheets desired to be manufactured. Connected to the lower frame 34 is a similarly sized and shaped lower platen 52. As seen in FIGS. 1 and 3, the upper platens 50 and lower platen 52 extend longitudinally between the upper rollers 40, 42 and lower rollers 46, 48, respectively. The lower platen 52 is positioned and held in the lower frame 32 such that the upper surface of the lower platen 52 is approximately tangential to the uppermost arcs of the lower rollers 46, 48. In a similar manner, the lower surface of the upper platen 50 is approximately tangential to the lowermost arcs of the upper rollers 40, 42. While the platens 50, 52 are situated very generally horizontally, in the preferred embodiment they are not both truly horizontal, nor are they parallel. The platens 50, 52 are mounted in the frame 30 so to be non-parallel, and at least one of them defines a very mild angle with respect to horizontal, as shall be further described herein after.

Each pair of rollers 40, 42 and 46, 48 has disposed there around a continuous belt. An upper belt 24 is wrapped around the upper rollers 40, 42, and the lower belt 26 is wrapped around the lower rollers 46, 48. The upper rollers 40, 42 are adjusted so that the upper belt 24 is tautly engaged with the upper rollers, and the frictional engagement of the belt 24 with at least one, preferably both, of upper rollers 40, 42 results in the belt 24 moving as the upper rollers rotate. The upper belt 24 accordingly acts as a sort of track conveyor belt that moves under the power of one or both rollers 40, 42. The upper belt 24 thus continuously moves circuitously around the rollers 40, 42 as the rollers undergo powered rotation about their respective axes. And similarly again, the lower rollers 46, 48 are adjusted so that the lower belt 26 is tautly engaged around the lower rollers, and the frictional engagement of the belt 26 with one or both lower rollers 46, 48 results in the lower belt 26 moving as the lower rollers rotate. The lower belt 26 accordingly acts as a track conveyor belt that moves under the power of one or both lower rollers 46, 48, and moves circuitously around the pair of lower rollers so long as they rotate.

In one working prototype of the invention, the belts 24, 26 provided were 12"×204" continuous, heavily reinforced rubber belts available as Item No. SFE 3042384X3264R from Kaman Corporation of Bloomfield, Conn., USA. Such belts must be capable of withstanding the elevated temperature of molten composite product as it emerges from the extrusion die 20.

Referring still to FIGS. 1 and 2, the upper platen 50 is situated "inside" below the upper belt 24, and the lower platen 52 is inside above the lower belt 26. Thus, the upper belt 24 moves around the two upper rollers 40, 42, and also moves around the upper platen 50. The tension in the upper belt 24 holds it in flush sliding contact with the lower surface of the upper platen 50. The upper belt 24 accordingly is in sliding contact with a longitudinal length of the upper platen 50 (i.e. underside), as the belt extends between the lowermost arcs of the upper rollers 40, 42. In a similar but inverse manner, the lower belt 26 moves around the two lower rollers 46, 48, and moves around the lower platen 52 (along an upper surface thereof). The tension in the lower belt 26 holds it in flush sliding contact against the upper surface of the lower platen 52. Thus, the lower belt 26 is in sliding contact with the longitudinal length of the lower platen 52, as the belt 26 extends between the uppermost arcs of the lower rollers 46, 48. In this disclosure and in the claims, "sliding contact" includes the optional use of bearings, small rollers, lubricated surfaces or wheels to promote smooth movement of the belt along and against the surface of a platen.

The platens 50, 52 in a preferred embodiment are not parallel. The platens, in operative combination with the belts 24, 26, function to provide the "moving press" advantage of the apparatus. Rather than being parallel, the platens 50, 52 are arranged to converge towards the back or discharge end of the apparatus. Referring to FIG. 1, it is seen that at the front end (to the right in FIG. 1) of the platens, the belts 24, 26—which are in sliding contact with the platens 50, 52—are separated by a distance $D_1$. At the opposite back end of the platens, the belts 24, 26 (again in flush contact with the platens) are separated by a second distance $D_2$. In this apparatus, $D_1$ is always greater than $D_2$. This is accomplished by tilting one or both platens 50, 52 slightly from the horizontal. As illustrated in FIG. 2, the upper platen 50, for example, is canted so that the angle defined between the top of its front end portion and the vertical is slightly less than 90 degrees. Thus the front end of the upper platen 50 is in this example slightly higher than the opposite back end, in relation to the floor or other horizontal datum. As likewise seen in FIG. 2, the angle defined between the bottom of the front end portion of the lower platen 52 and the vertical is slightly less than 90 degrees. Thus the front end of the lower platen is slightly lower than its back end.

It is noted, however, that there is a convergence of the platens 50, 52 proceeding from the front of the apparatus 10 toward its back (i.e., right to left in FIG. 1). This convergence may be realized by disposing one of the platens generally horizontal while tilting the other, opposing, platen away from the horizontal. It is relative convergence that is contemplated, and a suitable configuration of the apparatus 10 could be devised wherein the platens approach a vertical orientation in relation to the floor or ground.

In one embodiment of the apparatus, the platens 50, 52 are about seven feet long. The belts 24, 26 thereon are spaced apart a distance of $D_1$ at their front ends (FIG. 1), the distance $D_1$ being about 0.375 inches, plus or minus about 0.031 inches. In this example, the thickness of the belts is taken into account, the distance of separation actually being taken from the face of the upper belt 24 to the face of the lower belt 26; thus, the platens actually are spaced to account for the thickness of the belts, each belt 24 or 26 may be about 0.187 inches thick. At the other, back end of the platens, the belts are separated by a distance $D_2$ that is about 0.25 inches, plus or minus 0.031 inches. Thus, it is seen that the belts and platens converge, progressing from the front end of the apparatus toward the back end.

The degree of tilt of one or both platens 50 and/or 52 preferably is adjustable, so to also selectively control the convergence of the platens. One such manner of controlling and adjusting is to have the lower platen fixed in position within the lower frame 34, but slightly adjust the position of the upper frame 32 in relation thereto. One possible manner of adjusting the angle between the two platens 50, 52 is by means of shimmed junctions 27, 28 connecting the upper frame 32 to the lower frame 34 at the front (27) and the back (28) of the apparatus 10. Only two such shimmed junctions are depicted in FIG. 1, it being understood that there are similar junctions at each of the four horizontal corners of the overall frame 30. Because in one embodiment the upper platen 50 is fixedly secured to the upper frame 32, and the lower platen 52 is fixedly secured to the lower frame 34, calculated manipulation of one or both shimmed junctions 27 or 28 (i.e., by adding or removing shims of selected thicknesses) results in the selective raising or lowering of the front end of the upper frame 32 in relation to the front end of the lower frame 34. Raising the front end of the upper frame 32 increases the angle of convergence between the platens, while lowering it closer to the front end of the lower frame 34 decreases the angle of convergence.

It will be immediately understood, however, that any of a wide variety of modes for adjusting the angular position of the upper platen 50 relative to the lower platen 52 may be employed. For example, hydraulic and/or screwable junctions and connectors may be employed, and either manual or motorized means may be adapted. Further, it is within the capability of a mechanic of ordinary skill to devise a variety of different yet suitable means for adjusting the respective angles of tilt of the two platens 50, 52 to permit the angle of convergence between the platens to be finely tuned. Such adjustments may be, for example, by having a unitary frame 30 and relatively immobile upper and lower frame sections, but pivotally connecting an end (such as the back end) of each platen 50, and or 52 to the frame 30 (e.g., in a hinge-like manner), and then having a controlled powered means (hydraulic, rotating screw-with-threaded receiver) for moving the opposite end(s) of the platens up or down. The "inclined planes" comprising the two platens 50, 52 thus are adjustable to define a wide range of angles relative to the horizontal. Accordingly, the thickness of a sheet of composite material 70, as it moves through the apparatus according to the present process, can be regulated to generate a final product of a pre-selected thickness.

As depicted by the directional arrows in FIGS. 1 and 2, the front rollers 40, 46 are driven to rotate in opposite directions. The lower front roller 46 rotates counterclockwise as seen in FIGS. 1 and 2 (clockwise in FIG. 3), while the upper front roller 40 rotates clockwise (counterclockwise in FIG. 3). The upper back roller 42 rotates in the same sense or direction as the upper front roller 40, and the lower back roller 48 rotates the same direction as the lower front roller 46. At the front of the apparatus 10, therefore, the belts 24 and 26 converge as they round the bends defined by the front rollers 40, 46; at the back of the apparatus, the belts diverge as they round the bends defined by the back rollers 42, 48.

FIGS. 1 and 2 show how, when molten composite material 70 emerges from the extrusion die 20, it is pushed toward the moving rollers 40, 46 by the action of the extruder 22. The material 70 is pushed across the heated bridge 40 toward the front rollers 40, 46; upon entering the gap 54 between the front rollers, the material is caught by the moving belts 24, 26, and forcibly fed between the front rollers and toward the platens 50, 52. The traction of the belts 24, 26 moves the malleable material through the processing provided by the apparatus 10.

FIGS. 1 and 2 also show the optional bridge 44 and the pre-compression roller 56. The bridge 44 is, preferably, a heated metal structure that supports the moving material as it approaches the moving rollers 40, 46 and belts 24, 26. The bridge very preferably is heated (e.g. to about 200-300 degrees F.) by any suitable means, either internally (e.g., internal electrical resistance coils) or externally (overhead heating coils or lamps) to maintain the viscosity of the material 70. It has been determined that the bridge 44 preferably is composed of stainless steel, to which the molten material 70 is not prone to adhere.

Particular reference is made to FIG. 2, an enlarged view of the apparatus in the vicinity of the extruder die 20. The cylindrical pre-compression roller 56 is a free-wheeling roller of comparatively reduced diameter. The pre-compression roller 56 preferably has its working surface comprised of stainless steel, also to avoid adhesion of the molten composite material 70 thereto. The pre-compression roller 56 serves to even the upper surface of the moving material 70 as the material emerges from the extrusion die 20, and also to mildly "smash" or compress the material 70 prior to the material's delivery into the gap 54 between the belts 24, 26. This pre-compression function is believed to enhance the ultimate strength of a finished composite product panel.

The vertical distance between the bottom tangent of the pre-compression roller 56 and the bridge 44 is selectively adjustable by controlled movement of the bridge and/or the roller 56. Preferably, the absolute vertical position of the bottom of the pre-compression roller 56 is just slightly lower than the height of the top of the orifice of the extrusion die 20. When adjusted to a desired separation distance, the bridge 44 and pre-compression roller 56 are temporarily locked into position. (Their relative positions preferably are adjustable, but fixed during operation of the apparatus.)

A continuous "ribbon" or sheet of molten composite material is delivered to the apparatus 10 so long as the extruder 22 remains active.

As the composite material 70 emerges from the die 20 as seen in FIG. 2, it is forced toward the pre-compression roller 56. The roller 56 engages the upper portions of the mass of material 70, and mildly presses the material to a vertical thickness equal to or modestly greater than the minimum distance separating the front rollers 40, 46 (with the belts thereon). Some rotary force is applied to the pre-compression roller 56 by the longitudinal progress of the moving material 70. It is seen therefore, that the heated bridge 44 serves to support the material 70 as it translates from die 20 to rollers 40, 46. The bridge 44 and pre-compression roller 56 in combination serve to pre-form and pre-compress the moving molten material 70 into a material shape and thickness that promotes smooth passage of the material into the gap 54 between the front rollers 40, 46.

Thus, the enlarged view of the apparatus seen in FIG. 2 depicts in side view how the molten composite material 70 emerges from the die 20 to flow between the pre-compression roller 56 and heated bridge 44 and into the gap 54. The moving belts 24, 26 then forcibly pull the sheet of material 70 in between the platens 50, 52 at an initial thickness of $D_2$.

Attention is returned to FIG. 1. Adjacent to the "downstream" half-length of the lower platen 52 is provided a heat transfer core 58. The heat transfer core 58 is a water-cooled radiator element of generally conventional construction. Cooler core 58 is placed in immediate adjacency or contact with the underside of the lower platen 52, and serves to remove heat from the lower platen by conduction and/or convection. (In alternative embodiments, a cooler core may also, or alternatively, be provided in a similar corresponding location adjacent the upper platen 50.) The cooler core 58 serves to cool the "back" portion of the platen 52, and thus to promote cooling of the material 70 before it emerges from the downstream or back end of the apparatus 10.

Notably, the cooler core 58 is located near the back half of the platen 52 only. It has been determined that the cooler core preferably not be placed on the front half of the platen 52, as doing so promotes too rapid of cooling of the material 70 moving through the apparatus 10. Rather, the cooling core 58 has a longitudinal extent that is one-half or less (e.g., approximately 33%) of the longitudinal extent of the platen 52 itself, and is located at the downstream half of the platen 52. Active cooling of the composite material 70 accordingly occurs in the moments immediately prior to the material's emergence from the apparatus 10.

In practice, the method and apparatus of the invention function as a moving press for the composite material. Once the viscous material 70 is delivered across the bridge 44 to the rotating front rollers 40, 46 and rolling belts 24, 26, the material is drawn into the gap 54 and is compressed between the front rollers. Such compression is maintained and continued by the action of the belts 24 and 26 which press down and up, respectively, against the material sandwiched therebetween. At the point of entry between the front rollers, the material 70 may have a thickness of, for example, 0.375 inches to 0.5 inches, and can be anywhere from a foot to about four feet in lateral breadth.

The moving belts 24, 26 draw and convey the, hot, still-malleable sheet of composite material 70 into the horizontally broad, but vertically narrow, space between the platens 50, 52. The conveyor belts 24, 26 transport the material 70 from the front end of the apparatus 10 to the back end thereof. The constantly moving belts 24, 26 forcibly convey the material 70 into the vertically ever-narrower space between the platens 50, 52. Owing to the convergent disposition of the platens relative to one another, as the material 70 is transported between the moving belts 24, 26 and toward the back end of the apparatus 10, the material is constantly and increasingly compressed; this compression occurs between the belts due to the immobility of convergent platens 50, 52. Use of an appropriately sized die 20 permits the ribbon of composition 70 to be rolled and compressed into a sheet of desirable lateral breadth, e.g., four feet. The compression occurs during the entire time the ribbon sheet of material 70 is moving the length of the apparatus 10. Significantly, the sheet of material cools while it is under compression, which promotes the density, strength, and integrity of the finished composite product.

Passive cooling of the composite material 70 thus takes place where the platens 50, 52 are (comparatively) further apart, and where the material is still relatively plastic. As the moving belts 24, 26 transport the sheet of material into the back half of the apparatus, active cooling of the material optionally occurs under the influence of the heat transfer core 58. Although the composite material is hardening as it cools, it nevertheless is further and increasingly compressed as the vertical distance between the two platens progressively decreases as the material approached the back end of the apparatus. The converging platens and belts sandwich the material into an ever-narrower vertical space, thus constantly compressing the material 70 until it has hardened to the desired thickness and density. The desired thickness of the sheet of product thus may be, as seen in FIG. 1, a distance equal to or perhaps slightly less than $D_2$, the distance between the belts 24, 26 at the back ends of the platens 50, 52.

Accordingly, during its transport through the length of the apparatus 10, the sheet of composite material may be compressed, by the wedging effect of the converging platens 50, 52, from an initial thickness of, for example, about 0.375 inches to a final thickness of about 0.25 inches. These thicknesses are offered by way of example, not limitation; the adjustability of either or both platens 50, 52 permit variability in both initial and final thicknesses of the material sheet.

Once the sheet of composite material has proceeded through the apparatus 10 by the translating movement of the belts 24, 26, it emerges from between the back rollers 42, 46 at the back end of the apparatus. The composite sheet product, at this point a warm but rigid panel of solid composite material, is presented to a post-processing conveyer means 68 (e.g., belt or rollers). The rigid ribbon of product is then ready for further processing (such as cross-cutting into successive panels four or eight feet in length) and finishing, as desired.

Combined reference to FIGS. 1 and 2 also shows how, optionally, the final product optionally may be provided with a smooth, shiny finish surface on one side by melding a thin sheet of polyethylene onto the sides of the composite material sheet. A spool 90 has a thin film of polyethylene or other suitable thermoplastic (e.g., HDPE #2 sheeting) wound thereon.

Figure 4:
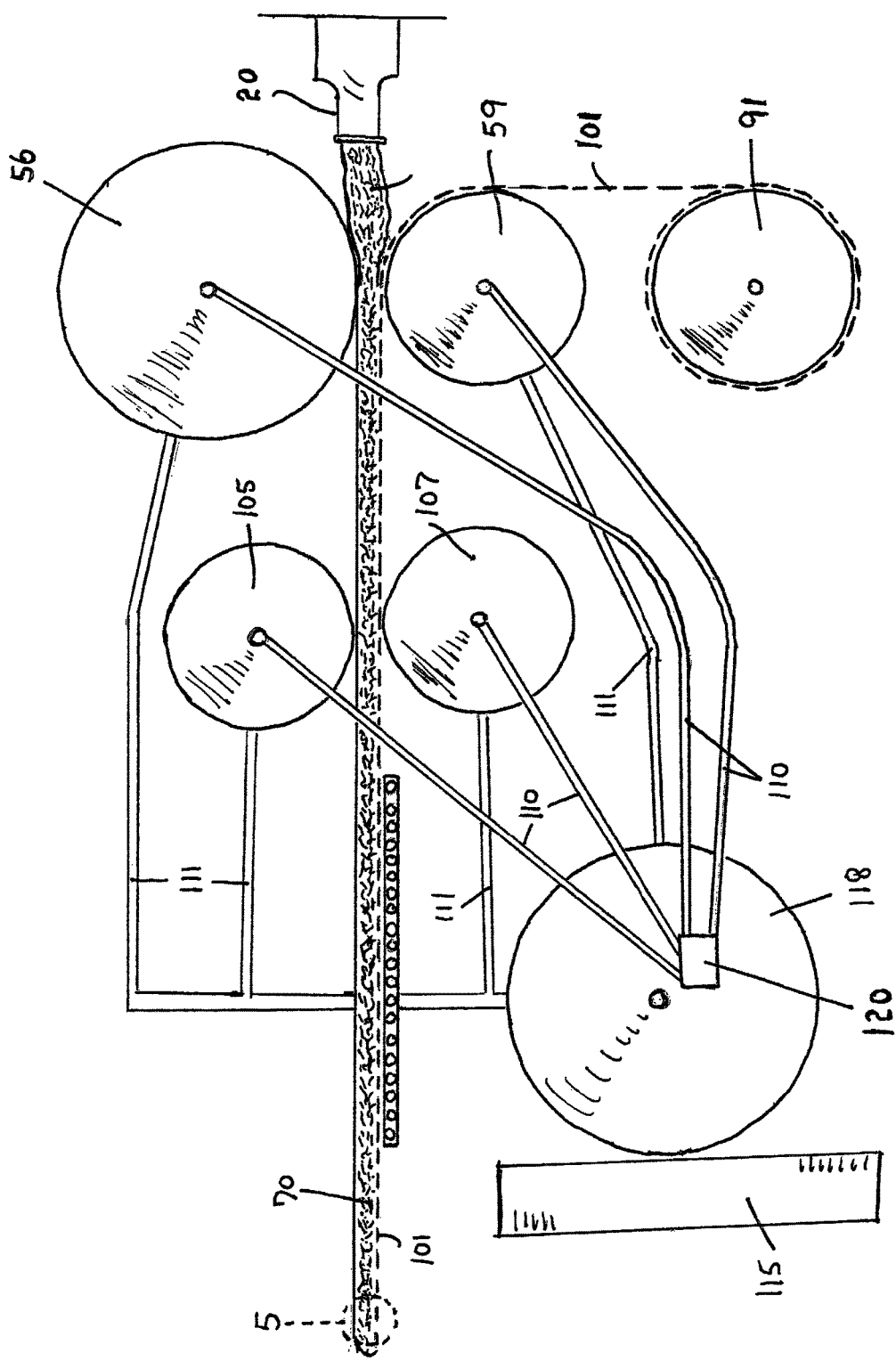
FIG. 4 is an enlarged side view (similar in context to the apparatus seen in FIG. 2) of an alternative embodiment of an apparatus and method according to the present invention.

In a featured aspect of the present product and method, screen spool 91 seen in FIGS. 1 and 4 has a flexible woven wire mesh screen 101 wound thereon, to be paid out for example as illustrated in the figure. The woven wire mesh 101 may be, for example, aluminum wire screen with a "Staralum" bright finish, 18×16 mesh (Tyler), 0.011 wire diameter screening; it is suitable and will not rust or corrode in the applied use. A suitable wire mesh is MODEL #10518 from New York Wire Company, Hannover, Pa., 17331 USA.

(Tyler Equivalent mesh size is the number of openings per (linear) inch of mesh. To calculate the size of the openings in a mesh the thickness of the wires making up the mesh material must be accounted.)

The spools 90, 91 are rotatably mounted on frame 30. Polyethylene film 92 is paid out from spool 90 for delivery to the pre-compression roller 56, while the wire mesh 101 is paid out from spool 91 to mesh roller 59 (FIGS. 2 and 4). The film 92 and mesh 101 are passed around respective the rollers 56, 59 as best seen in FIG. 2, and is rolled onto the upper and lower surfaces of the composite material sheet 70. The action of the rollers 56, 59 presses the film 92 and the screen mesh 101 into the still-hot composite material 70, where they are pressed to the surfaces of the material. The pressing action of the belts and main rollers on the material as it passes between the platens 50, 52 further compresses the film 92 into the respective surface of the composite sheet. Preferably, the film 92 is comprised of a thermoplastic similar to, or at least very compatible with, the thermoplastic constituent of the extruded composite material. As a result, the film 92 is thermally bonded and integrated to the surfaces of the product panel, providing an aesthetically pleasing finish.

In an advantage and feature of the present product and process, the screen mesh 101 is melded into the other surface of the composite sheet 70, but is not "submerged" therein. Rather, and as explained further herein, a portion of the wires of the mesh 101 remain exposed, and serves to provide means subsequently for using an adhesive to affix a film to this "working" surface of the ultimate panel.

FIG. 3 depicts additional possible aspects and particulars of one embodiment of the apparatus. It is seen that the rollers 40, 46, and 42, 48 may be driven by an engineered drive train of chains 61, 62, 63, 64. The chains loops 61-64 are directed and maintained by a series of suitably arranged sprockets, as well-known in the mechanical arts. The chain loops impart rotary power to two or more of the rollers 40, 46, 42, 48; the power to the system is provided by a motor 65 mounted on the frame 30. In a functional prototype of the apparatus, the motor 65 was a ½-hp electric motor, controlled with a DAYTON® brand power inverter, Model No. 3HX71, used to dramatically slow the motor rpm. Additionally, of course, the rotary action of the motor 65 can be geared down with known gearing/transmission devices.

Also seen in FIG. 3 is that there may be any number of free-wheeling intermediate minor supporting rollers 85 which guide and support the belts 24, 26 in their respective circuits around the main rollers 40, 46, 42, 48. There also may be provided suitable supporting brackets 83, 84 which support and maintain the upper and lower platens 50, 52 in their proper positions within the frame 30.

In a prototype of the apparatus, the motor 65, looped chain drive trains 61-64, and the configurations of the rollers 40, 46, 42, 48 were assembled and arranged so that the belts 24, 26 were driven at a linear speed of approximately 2,700 inches per hour.

Thus the preferred embodiment of the apparatus is for manufacturing a sheet of composite material, and succinctly described has a pair of spaced-apart platens 50, 52 converging toward each other from their respective first or upstream ends toward their respective second or downstream ends, the platens thus defining between them a narrowing gap or space. A conveyer belt means 24, 26, movably disposed along the platens 50, 52, moves the molten composite material 70 in narrowing space between the platens, and from the platen first ends toward the platen second ends where it is expelled. As it moves through the space between the converging platens 50, 52, the molten composite material is compressed between said platens, while a heat transfer core 58 disposed adjacent to at least one of the platens 52 to cool the molten material 70 while it moves between the platens.

Each of the platens 50, 52 has a downstream half-length, situated remotely from the first platen ends proximate to the extruder 22. The heat transfer core 58 is disposed adjacent to a portion of the downstream half-length of a platen 50, 52, to actively cool the composite material 70 after it has undergone substantial passive cooling, and compression, between the upstream half-lengths of the platens. The upstream first platen ends are disposable proximately to the material extrusion die 20 so that molten composite material 70 may emerge from the die 20 for movement toward the upstream platen ends. Between the die 20 and the platens 50, 52 is a heated bridge member 44 proximate to the platen ends; the bridge 44 supports the moving material 70 as it approaches the upstream ends of the platens.

The pre-compression roller 56 optionally but preferably is disposed above the bridge member 44 to compress the moving molten composite material 70 after the material emerges from the extrusion die 20, while it approaches the platen ends. The position of at least one of the platens 50 or 52 is adjustable in relation to a second, other, platen 52 or 50 to variably regulate the narrowing space between the platens.

The conveyer belt system has the first pair of rollers 40, 42 associated with the first one 50 of the platens, the a second pair of rollers 46, 48 associated with the second one 52 of the platens, the first endless belt 24 in wrapped engagement with the first pair of rollers 40, 42 and in flush sliding contact with the first platen 50, and, finally, the second endless belt 26 in wrapped engagement with the second pair 46, 48 of rollers and in flush sliding contact with the second platen 52.

Cooled while under constant pressure by the "moving press" feature of the apparatus 10, the rigid, durable panels of product emerge there from having high density, and a thickness of up to 0.75 inches, and yet desirably are cool enough to be handled (if needed) by a gloved worker.

Figure 5:
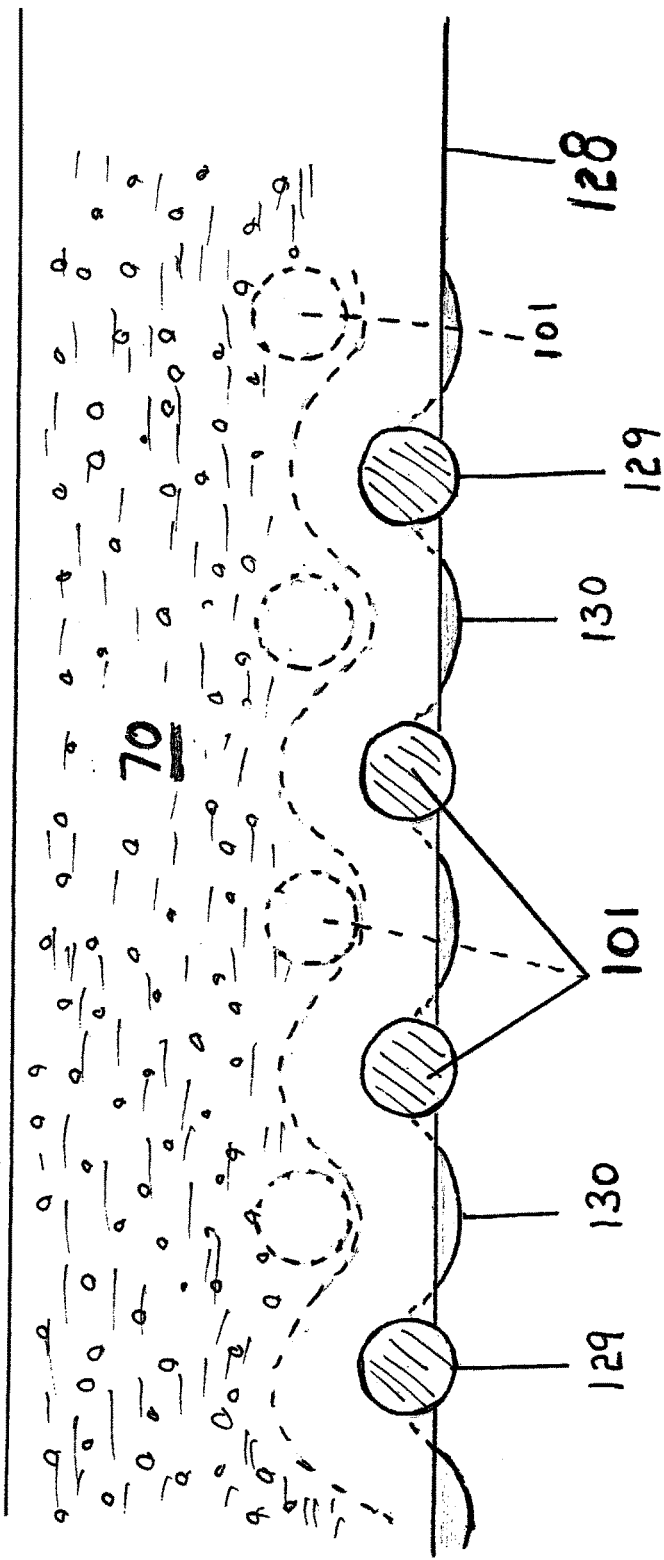
FIG. 5 is an enlarged vertical section view, taken at location "5" of FIG. 4, of the composite body depicted in FIG. 4.

Attention is now invited to FIG. 4, illustrating an alternative improved embodiment of the invention. The system of FIG. 1 can be modified and adapted (i.e., at the right-hand side of system as seen in FIG. 1) to incorporate the components and methodology of the disclosure of FIG. 4. In this alternative embodiment, the molten composite optionally is cooled by oil-cooled rollers. There also is yet provided the pressing of a wire mesh into one side of the cooling extruded panel in such a manner as to leave exposed on that "working" side of the panel a portion of the screen or mesh to provide a surface to which a plastic film may subsequently be affixed using conventional adhesives. This improvement is usable with the specific systems and embodiments disclosed previously hereinabove, and the systems and configurations of FIGS. 1-4 are or may be modified and adapted by persons skilled in the art to include the elements, features and processed described below. However, it is to be understood that the subsystems, components, arrangements and methodologies described hereinafter may find utility in other and different composite fabrication systems and methods besides those described hereinabove. Thus, the features, aspects and advantages of the apparatus and method particular to FIGS. 4-5 are not limited to use in the overall systems and apparatuses described hereinabove.

In the embodiment of FIG. 4, there is provided the upper precompression roller 56 and the mesh roller 59 similar to those described previously. There also is an upper front roller 105 and a lower front roller 107. The upper roller 56 preferably is fabricated from stainless steel, and is a cylinder of, for example, approximately 24 inches diameter. The mesh roller 59 also preferably is fabricated from stainless steel, and likewise has a diameter of, for example, about 24 inches. The wire mesh 101 is wrapped upon and paid out from the screen spool 91. The upper roller 105 also preferably is of stainless steel and is cylindrical in approximately 12 inches diameter, for example. The lower front roller 107 is substantially the same as the upper roller 105.

FIG. 4 illustrates that there also is a cooling vat 118 that is in fluid communication with each of the rollers 56, 59, 105 and 107. A light-weight oil flows to and from the vat 118 via the coolant respective delivery lines 110 and coolant return lines 111.

The cooling vat 118 is in operative relation with a cooler 115. Cooler 115 cools the oil in the vat 118. The cooler 115 may be a refrigerator assembly that blows refrigerated air past the vat 118 to cool the oil therein; the interior of the vat may be provided with vanes or baffles (not shown) to promote cooling of oil moving through the vat, in manners known. Alternatively, there the cooler 115 may be a heat exchanger in which oil flows between the vat 118 and the cooler to cool oil flowing from the cooler into the vat, also according to cooling methods well-known generally.

A pump 120 pumps cooled oil from the vat 118 and into the delivery lines 110, and via the respective delivery lines to corresponding ones of the rollers 56, 59, 105 and 107. The oil flows through the interiors of the rollers, or though interior cooler lines (not shown) inside (and/or interiorly disposed against the axial walls) of the rollers, thereby to cool the rollers and thus assist in active cooling of the molten composite 70 as it is compressed by the rollers 56, 59, 105 and 107. Oil heated in the rollers 56, 59, 105 and 107 by the contact of the rollers 56, 59, 105 and 107 with the hot molten composite 70 is returned by suitable means (e.g., primarily by gravity or as supplemented by mechanical pumping) via the return lines 111 for return to the vat 118. The cooling oil thus is continuously re-circulated through the system during operation.

The apparatus of FIG. 4 is well-suited to provide the finished composite panel with a working surface to which adhesives will stick.

Known wood-plastic composite fabrication techniques involving the heated compression of a melted composite material (by pressing and/or extrusion) generate a final product that, when cooled, has exterior surfaces that manifest anti-adhesive properties, that is, surface to which many or most common adhesives do not reliably adhere or "stick." This is due to the heating and compressing and cooling of the plastic-containing composite, which is believed to cause certain of the polymers and/or hydrocarbons within the plastics to accumulate in a thin layer or coat upon the cooled product. Thus, known completed composite wood-plastic sheets or panels normally have surfaces that exhibit a lubricative, waxy, or oleaginous feel character or texture resistant to the adhesive action of glues and adhesives. Previously, this problem has been addressed by the costly and complicated process of "flaming" the final product. "Flaming" is the step of exposing the surfaces of the cooled and nearly finished composite to a brief, controlled, burst of hot flame which burns off the undesirable oily layer of the product. The presently disclosed manufacturing process eliminates this undesirable need to "flame" a product to treat its surface to accept an adhesive.

Referring to FIG. 4, the process thus preferably includes the steps of rolling a screen mesh 101 onto one side (the underside in FIG. 4) of the composite material 70 during fabrication. Non-thermoplastic mesh materials may in alternative embodiments be employed. However, it has been determined that metal screen is preferred, as metals do not exhibit the undesirable "oily" layer after heating. Again, a suitable wire mesh for this purpose is aluminum wire screen, 18×16 mesh (Tyler), with a 0.011 wire diameter, such as MODEL #10518 manufactured by New York Wire Company, Hannover, Pa., 17331 USA. The mesh 101 is paid out from the spool 91 and wrapped partially around the roller 59. The rollers 59 and 107 controllably press the mesh into the surface of the still-malleable composite material 70 flowing from the extruder 20. However, the pressure of the rollers 59 and 107 does not fully and completely submerge the mesh 101 into the body of the composite 70. Rather, a significant portion of the mesh 101 remains exposed above the surface of the composite panel. The pressures applied by the rollers 59 and/or 107 adjusted, according for example to the viscosity of the bath of molten material, to provide the desired amount of controlled partial submergence of the mesh 101 into the surface of the molten body panel. Significantly, the hot mesh 101 itself (particular when a metal wire mesh is employed) promotes some "burn off" of any polymer or hydrocarbon layer remaining on the exterior (working) surface of the cooling panel; further the exposed portions of the wire mesh, after they cool, are relatively free of the anti-adhesive residues, and serve as reliable anchoring surfaces for subsequently applied adhesives.

Figure 6:
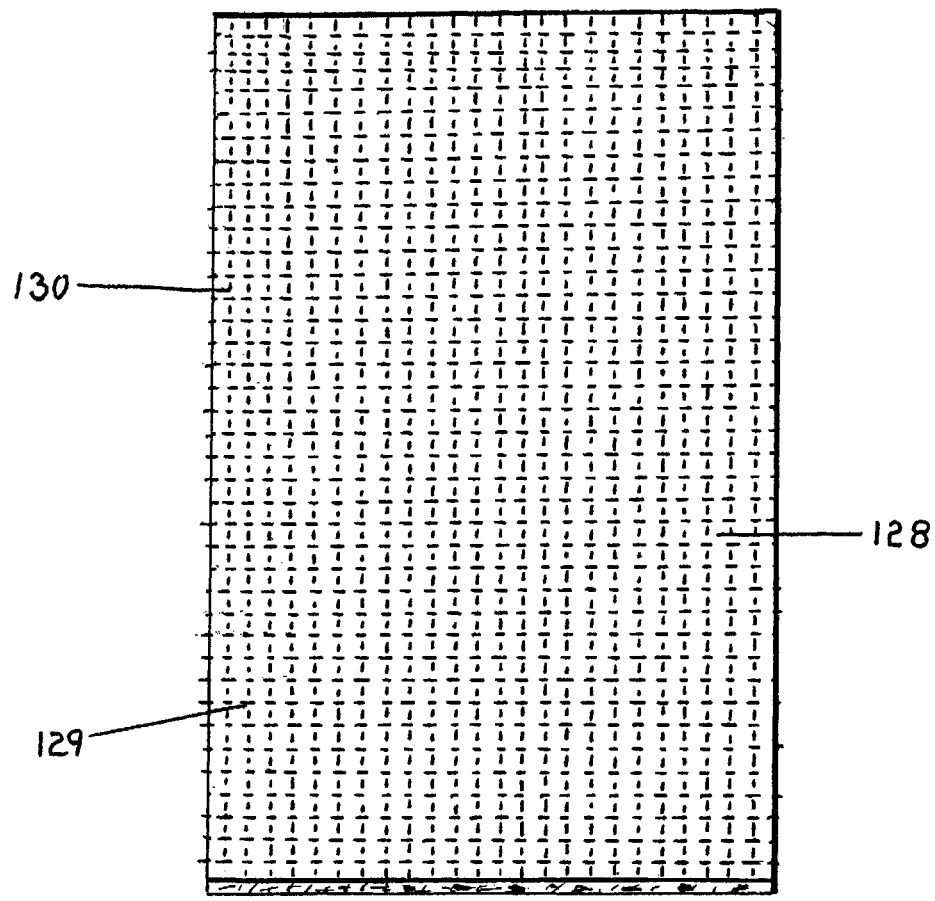
FIG. 6 is a plan view of a working surface of a portion of a composite panel fabricated in accordance with the methodology of the system of FIG. 4.

FIG. 5 further illustrates, in an enlarged view, the working surface 128 of a composite panel fabricated according to the foregoing improved method. (FIG. 5 is an enlarged vertical sectional view of the area denoted "5" in FIG. 4.) The mesh 101 is well-embedded in the surface 128 of the composite body 70 of the panel. But as illustrated by FIG. 5, portions P of both the warp 129 and the weft 130 of the screen mesh 101 remain exposed above the surface 128 of the panel body 70. In a cooled completed panel, segments of less than about 50%, but greater than about 10%, of the overall circumference of the exposed portion P of the wire of the mesh remains exposed above the surface of the body 70. The exposed portions P of the wires may thus approximate semi-cylinders, or arcuate segments of semi-cylinders; however, the individual wires rise and fall in "waves" due to the woven character of the mesh 101, so the actual amount of surface exposure of a given individual wire varies somewhat along the axial length of a particular wire. (FIG. 6.) Thus, a minor (e.g., preferably less than approximately 33%, but more than about 10%, of the total lateral face area of the mesh, as seen in FIG. 5) portions of the mesh 101 remain exposed above the working surface 128 of the panel. These exposed portions P of the mesh are available for the attachment thereto of adhesives, thus permitting the reliable use of ordinary adhesives on the working surface 128. This permits the use of comparatively ordinary adhesives to affix, subsequently, a further layer of material to the working surface 128.

Reference also is made to FIG. 6, illustrating an appearance of a working surface 128 of a part (e.g., about to scale in FIG. 6, measuring by way of sample example 3"×4.5") of a composite panel product according to the invention. In FIG. 6, the white portion of the surface 128 represents the wood-plastic composite material comprising the body 70 of the panel part. The dark lines represent portions of both the warp 129 and the weft 30 of the mesh 101 that remain exposed above the surface of the composite body 70. Again, as individual wires are woven to define the mesh 101 they periodically emerge and submerge, from and into, the composite body material 70, as one proceeds axially along any selected one of the wires of the screen. This lends the somewhat checkered appearance to the working surface 128.

Figure 7:
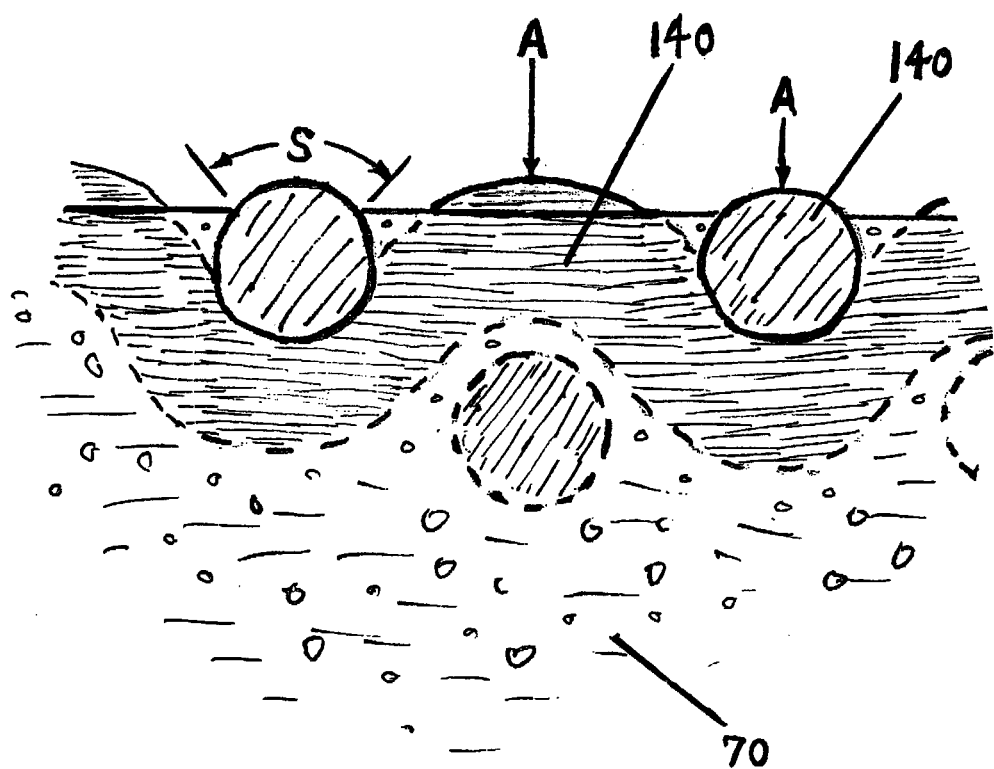
FIG. 7 is a still further enlarged view of the vertical section view of the composite body of a panel according to the present invention, showing exposed portions of a mesh partially embedded in the composite material.

FIG. 7 offers an enlarged view of a portion of the sectional view of FIG. 6. It is seen that as each individual wire 140 defines the woven character of the mesh screen 101, rises and falls, and most of the wire volume is continually immersed and fully surrounded by the body 70. However, a portion of each weft wire partially emerges above the surface of the composite body 70 between the warp wires. Likewise, a portion of each warp wire partially emerges above the surface, between the weft wires. At its maximum point of protrusion or emergence, each wire has an apex A; the apex is where a portion of exposed wire protrudes the most, between the adjacent exposed sections of warp or weft wire. As seen in FIG. 7, each wire gradually emerges from the cooled body 70, obtains its apex A, and then gradually re-submerges into the body to be completely below the surface of the body. It has been determined that it is preferable that the exposed segment S of a wire's circumference, at any selected apex in the mesh, be from approximately 10% up to about 50% of the wire's total circumference. Thus the subtended angle of an exposed axial length of wire generally varies from 0° (where the wire fully submerges/emerges into the body 70) up to a maximum of 180° at the apex A. For each exposed axial length of wire, the apex A has a subtended angle of at least about 36°, i.e., 10% of the full circumference of 360°. It is preferable, although not always strictly demanded, that the segment S of circumference preferably does not exceed about 50% of the wire's circumference, to provide that the exposed length of wire remain well-anchored in the body.

If the panel is to be used to fabricate a road sign, it is desirable to affix to the working surface 128 a film bearing the sign indicia and information. Such indicia are commonly provided by applying a design layer to the working surface 128. By means of the product fabricated according to the invention of FIGS. 4-6, it is possible, for example, to apply a design film such as 3M™ High Intensity Grade Prismatic Reflective Sheeting (e.g., Type IV), or 3M™ Diamond Grade™ Reflective Sheeting (e.g., Type IX or XI), (or 3M Prismatic Reflective Sheeting 3990) available from 3M Corporation, St. Paul, Minn. 55144-1000, USA. The adhesives on such desirable commercially available sheeting attach readily and reliably to the working surface 128 without the need to "flame" pre-treat the working surface to remove the anti-adhesive residues from the heat-pressing of the panel body 70. Further, as mentioned, it has been surmised that in addition to offering anchor surfaces (the exposed lengths of wire) to which adhesives (e.g., silicone adhesives) may stick, that the mesh 101 while still hot during processing (for example, where the mesh 101 is pressed into the composite body 70 by the lower roller 107), the hot mesh helps burn off anti-adhesive residues on the working surface 128. As a beneficial result, the foregoing described or other plastic films or layers may be affixed to the working surface 128 with ordinary adhesives subsequent to the cooling and cutting of the body 70, without the need to pre-treat the working surface. Thin films and adhesive tapes can be securely affixed, subsequent to the cutting and finishing a cooled panel, to the working surface 128, without pre-treating the surface and with enhanced confidence that the adhesive bond will yield favorable results in applicable peel strength tests (e.g. ASTM 903 or ASTM B571 other suitable test method).

Figure 8:
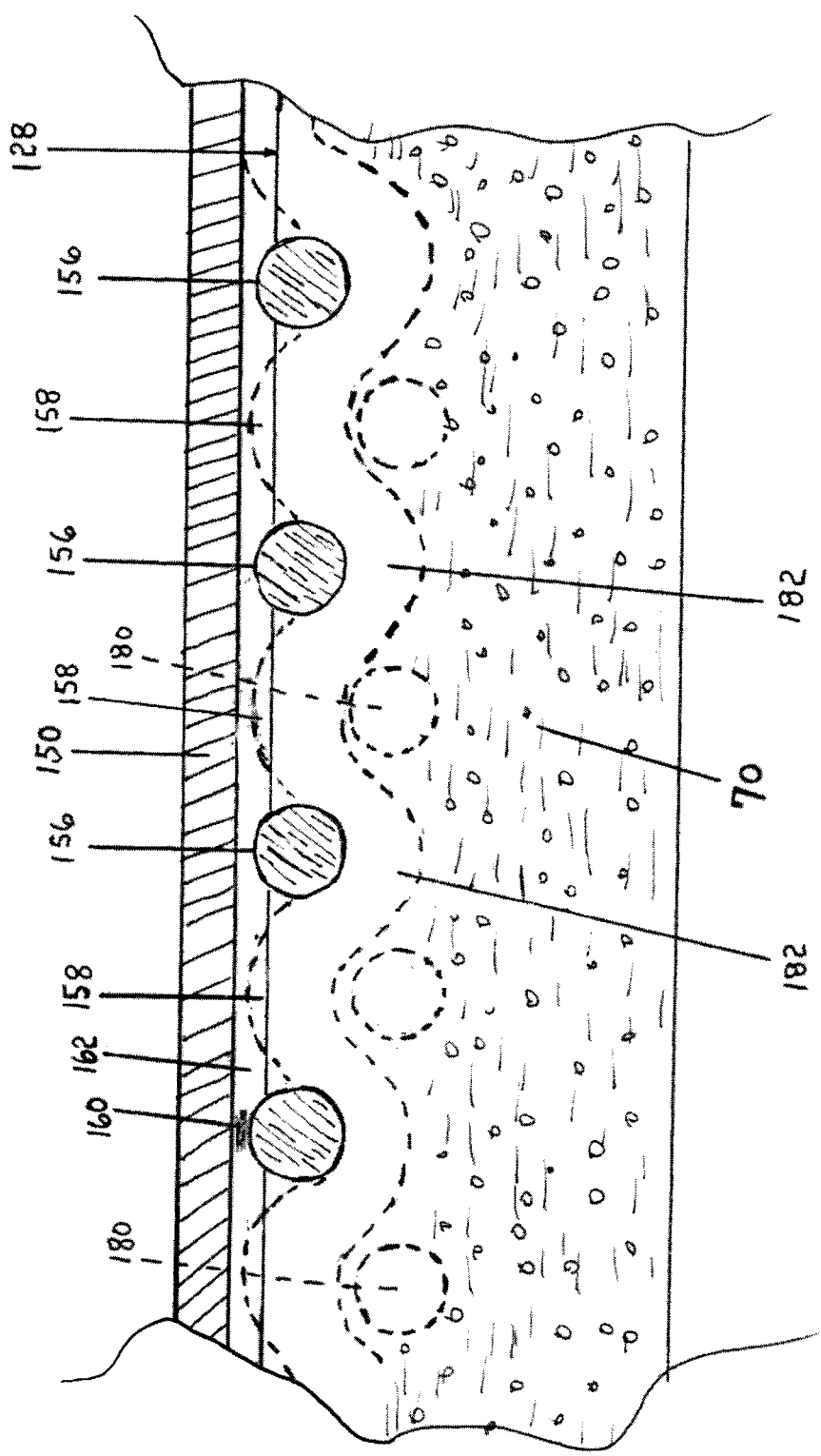
FIG. 8 is an enlarged side view (similar in context to FIG. 5) of an embodiment of a composite body according to the present invention, illustrating the attachment of an appliqué film or layer to the composite body.

FIG. 8 shows that a process and apparatus according to this enclosure includes the application of an appliqué film or layer 150 to the body 70 of a panel fabricated according to the disclosed manufacturing process. The film 150 can be of any of a variety of thicknesses or compositions, and may be flexible or substantially rigid. For example, it can be a design film such as 3M™ High Intensity Grade Prismatic Reflective Sheeting (e.g., Type IV) from 3M Corporation. The appliqué film 150 is applied, as by rolling or any other suitable controlled pressure mode, to the working surface 128 of the panel. FIG. 8 shows that the exposed portions 156 of the wire weft and the exposed portions 158 of the wire warp extend above the surface of the panel body. Also seen are fully submerged portions 180 of the weft, fully contained within the body 70 and likewise submerged portions 182 of the warp. Thus an adhesive 160 in the adhesive space 162 is able to adhere to the exposed portions 156, 158 of the wire mesh 101 even though the adhesive may not readily adhere to the surface of the panel body 70. But the adhesive 160 readily and securely attaches the appliqué film 150 to the exposed portions 156, 158 of the wire mesh. A step of the product manufacturing process thus may include supplying a suitable an adhesive to the working face 128 of the panel body, and applying an appliqué film to the working face of the panel and allowing the adhesive to secure the appliqué film to the portions of the mesh 101 exposed above the surface of the panel body. The adhesion between the mesh 101 and the appliqué film securely attaches the film to the panel. Of course, the adhesive may also be pre-applied upon an adhesive surface of the appliqué film 150, in which instance the adhesive surface of the film is rolled or otherwise pressed against the working surface of the panel in order to adhere the film to the exposed portions 156, 158 of the wire mesh.

An added benefit of disposing the mesh 101 into the composite body 70 according to the foregoing is the reinforcement provided to the body 70 during fabrication, while the composite is still hot, plastic, and malleable. The hot plasticity of the body 70 during processing leaves the body vulnerable to unwanted sags or deformations until the body has cooled. The presence of the mesh 101 helps safeguard the hot composite body 70 against unwanted deformations during panel fabrication.

Further, the physical reinforcement provided by the mesh 101 allows the bendable, still-cooling composite to be wrapped partially around comparatively smaller-diameter rollers or drums in those manufacturing systems employing such arrangements. For example, in some known composite panel fabrication systems, the hot malleable composite is manipulated across and upon arcuate segments of rotating drums, sometimes fed through S-curve-shaped pathways, while cooling. Such systems require the use of either large-diameter (e.g., in excess of 36 inches diameter) rollers or drums, and/or that the composite be less than about ⅜-inch thick (e.g., for a 48-inch wide sheet) while being bent— otherwise the composite sheet tends to crack unacceptably during rolling manipulation. With the present method, the presence of the mesh 101 allows thicker sheets (e.g., in excess of ½ to ¾ inches) to be bent across a segment of a small-diameter (e.g. 12 to 24 inches diameter) roller without unacceptable separation and cracking.

The presence of the mesh 101 in a finished, cooled completed panel also offers additional strength and resistance to breaking and penetration. Panels to be used in road signage, for example, are subjected to impacts from snow plows, flying debris, and vandalism. A test panel fabricated with the mesh 101 as described above passed a Gardner Cold Impact Test at 12 psi and at 16 psi, (at zero degrees Fahrenheit) (Test ASTM 5420).

A method of the invention is apparent from the foregoing. There is provided a method for making a composite panel from a molten composite material, in which the composite material is a composite of cellulose (wood) particles and melted extruded thermoplastic. Basic steps of a preferred method include: providing a pair of spaced-apart planar platens 50, 52 converging toward each other from first ends of the platens to second ends of the platens, thereby defining a narrowing space or gap there-between; disposing the first platen ends proximate to a material extrusion die 20; extruding molten material from the die 20 for movement to the first platen ends; pressing a mesh 101 into a surface of the molten material; moving the molten composite material in the narrowing space from the platen first ends toward the platen second ends, thereby constantly compressing the molten composite material between the converging platens; cooling the molten material while constantly compressing the molten material between the pair of converging platens; delivering a composite panel (70) from between the second ends of the platens 50, 52, the panel having a working surface 128 with the mesh 101 partially embedded therein; leaving portions 156, 158 of the mesh exposed above the working surface; and then attaching an appliqué layer 150 to the working surface 128 by using an adhesive 160 to adhere the appliqué layer to the exposed portions of the mesh. Extruding molten material preferably comprises extruding a molten material comprising ground wood particles and pulverized thermoplastic particles. Pressing a mesh 101 comprises rotating a mesh roller 59 against the mesh and the molten material. The mesh roller preferably is cooled with a cooled oil flow. The step of pressing a mesh 101 comprises pressing a metal wire screen. The method optionally further comprises the step of evening an upper surface of the molten material with a pre-compression roller 56 as the material emerges from the extrusion die 20, which also may be cooled with a cooled oil flow. When a metal wire screen is pressed, the method preferably includes pressing a wire screen having a Tyler Equivalent mesh size of 18×16. Leaving portions of the mesh exposed preferably involves leaving exposed up to about 50% of a circumference of any particular wire 140 comprising the metal wire screen. Attaching an appliqué layer 150 to the working surface 128 may comprise attaching a layer of prismatic reflective sheeting.

The invention thus overcomes the drawbacks of known methods in which the product is cooled at ambient air pressures, resulting in weaker, lighter, friable composition product. Also, the use of lengthy cooling systems downstream from compression facilities is avoided. No cooling mandrels are required. A finished panel can be provided with a working surface that does not need to be flamed or otherwise pre-treated in order to serve as a reliable adherend, to which a flexible polymeric or plastic or other thin film can be affixed with conventional, including silicone, adhesives.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above are hereby incorporated by reference.

I claim:

1. A method for making a composite panel from a molten composite material, comprising:
    providing a pair of spaced-apart planar platens converging toward each other from first ends of said platens to second ends of said platens, thereby defining a narrowing space there-between;
    disposing said first platen ends proximate to a material extrusion die;
    extruding molten material from the die for movement to said first platen ends;
    pressing a mesh into a surface of the molten material;
    moving the molten composite material in said narrowing space from said platen first ends toward said platen second ends, thereby constantly compressing said molten composite material between said converging platens;
    cooling the molten material while constantly compressing the molten material between said pair of converging platens;
    delivering a composite panel from between said second ends of said platens, said panel having a working surface with said mesh partially embedded therein;
    leaving portions of the mesh exposed above the working surface; and
    attaching an appliqué layer to the working surface by using an adhesive to adhere the appliqué layer to the exposed portions of the mesh.

2. The method of claim 1, wherein extruding molten material comprises extruding a molten material comprising ground wood particles and thermoplastic particles.

3. The method of claim 2 wherein pressing a mesh comprises rotating a mesh roller against the mesh and the molten material.

4. The method of claim 3 further comprising cooling the mesh roller with a cooled oil flow.

5. The method of claim 2 wherein pressing a mesh comprises pressing a metal wire screen.

6. The method of claim 2 further comprising evening an upper surface of the molten material with a pre-compression roller as the material emerges from the extrusion die.

7. The method of claim 6 further comprising cooling the pre-compression roller with a cooled oil flow.

8. The method of claim 5 wherein pressing a metal wire screen comprises pressing a wire screen having a Tyler Equivalent mesh size of 18×16.

9. The method of claim 2 wherein the step of attaching an appliqué layer is taken without previously flaming the working surface.

10. The method of claim 5 wherein leaving portions of the mesh exposed comprises leaving exposed up to about 50% of a circumference of any wire comprising the metal wire screen.

11. The method of claim 2 wherein attaching an appliqué layer to the working surface comprises attaching a layer of prismatic reflective sheeting.

* * * * *